United States Patent
Ji et al.

(10) Patent No.: US 9,813,182 B2
(45) Date of Patent: Nov. 7, 2017

(54) SUBMARINE RECONFIGURABLE OPTICAL ADD/DROP MULTIPLEXER WITH PASSIVE BRANCHING UNIT

(71) Applicant: NEC Laboratories America, Inc., Princeton, NJ (US)

(72) Inventors: Philip N. Ji, Princeton, NJ (US); Ryuji Aida, Tokyo (JP); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 14/454,031

(22) Filed: Aug. 7, 2014

(65) Prior Publication Data
US 2015/0043920 A1 Feb. 12, 2015

Related U.S. Application Data

(60) Provisional application No. 61/863,005, filed on Aug. 7, 2013.

(51) Int. Cl.
*H04J 14/02* (2006.01)

(52) U.S. Cl.
CPC ........ *H04J 14/021* (2013.01); *H04J 14/0205* (2013.01); *H04J 14/0208* (2013.01)

(58) Field of Classification Search
CPC ............... H04J 14/0201; H04J 14/0205; H04J 14/0208; H04J 14/021; H04J 14/0216
See application file for complete search history.

(56) References Cited

U.S. PATENT DOCUMENTS

| 8,355,200 B2 * | 1/2013 | Ota ..................... H04B 10/291 359/341.41 |
| 8,483,564 B2 * | 7/2013 | Mu ..................... H04J 14/0257 398/46 |
| 2002/0089719 A1 * | 7/2002 | Joo ..................... H04J 14/0206 398/83 |
| 2004/0001248 A1 * | 1/2004 | Grubb ................. H04B 10/291 359/333 |

(Continued)

FOREIGN PATENT DOCUMENTS

WO    WO2011009341 A1    1/2011

OTHER PUBLICATIONS

G.A. Wellbrock, et al., "Investigation of Flexible Channel Spacing for High Spectral Efficiency Using Real-Time 100GbE Transponder", Proceedings of OECC 2012, Paper 5A2-3, Jul. 2012, pp. 419-420.

*Primary Examiner* — Leslie Pascal
(74) *Attorney, Agent, or Firm* — Joseph Kolodka (57) ABSTRACT

Systems and methods for data transport, including submarine reconfigurable optical add/drop multiplexers, branching units configured to receive signals from trunk terminals (TTs), and dummy light filters configured to pass useful signals through the filters, and to reflect dummy light. Optical interleavers are configured to separate useful signals into two or more groups of optical channels, and the optical channels are set to a frequency of either a left or a right portion of a total channel bandwidth. De-interleavers merge signal groups together from trunk terminals, and lasers at each of the transponders at the source terminals are configured to adjust a destination of a channel by fine tuning a frequency or wavelength of the one or more signals.

17 Claims, 5 Drawing Sheets

(56) References Cited

U.S. PATENT DOCUMENTS

| | | | |
|---|---|---|---|
| 2004/0190896 A1* | 9/2004 | Terahara | H04J 14/0208 398/5 |
| 2005/0175346 A1* | 8/2005 | Takeguchi | H04J 14/0204 398/83 |
| 2011/0200322 A1 | 8/2011 | Kovsh et al. | |
| 2013/0259055 A1 | 10/2013 | Ji et al. | |
| 2013/0259475 A1 | 10/2013 | Ji et al. | |
| 2014/0363161 A1* | 12/2014 | Oikawa | H04J 14/0202 398/48 |

* cited by examiner

SUBMARINE RECONFIGURABLE OPTICAL ADD/DROP MULTIPLEXER WITH PASSIVE BRANCHING UNIT

RELATED APPLICATION INFORMATION

This application claims priority to provisional application Ser. No. 61/863,005 filed on Aug. 7, 2013, incorporated herein by reference.

BACKGROUND

Technical Field

The present invention relates to submarine optical networks, and more particularly, to data transport using submarine reconfigurable optical add/drop multiplexing systems with passive branching units.

Description of the Related Art

Submarine optical networks form the backbone of global communication networks, and generally include main trunks that connect trunk terminals (e.g., point-to-point cable links with in-line optical amplifiers to boost the signal power), and branch paths which connect to other branch terminals. A branching unit (BU) is a network element that splits the signal between the main trunk and the branch path and vice versa. This allows the signals from different paths to share the same fiber instead of installing dedicated fiber pairs for each link. BUs generally perform signal splitting and combining functions optically, and thus the BU has a similar function as an optical add/drop multiplexer (OADM) in terrestrial wavelength division multiplexing (WDM) networks.

Existing BU and submarine networks have fixed, predetermined wavelength arrangements, and thus no reconfiguration is required after installation. However, a disadvantage of this arrangement is that the traffic in the global communication network is becoming more dynamic as internet-based traffic becomes more dominating. There have been efforts to add reconfigurability to networks, including employing tunable optical filters, replacing a single optical filter with an array of filters, and employing a wavelength-selective switch. However, each of the above-mentioned approaches includes drawbacks (e.g., limited quantity of BU configurations, added complexity to the BU, no full reconfigurability of BU, etc.), which are not desirable in submarine networks.

SUMMARY

A method for data transport using one or more submarine reconfigurable optical add/drop multiplexers (ROADM), including receiving one or more signals by one or more branching units (BUs) from one or more trunk terminals (TTs); passing the one or more signals through one or more dummy light filters, wherein useful signals pass through the one or more dummy light filters, and dummy light is reflected; separating the useful signals into two or more groups of optical channels using one or more optical interleavers; setting a frequency of each of one or more optical channels to either a left portion or a right portion within the a total channel bandwidth; merging signal groups together from two or more trunk terminals using one or more de-interleavers; and adjusting a destination of a channel by fine tuning a frequency or wavelength of the one or more signals at one or more source terminals.

A system for data transport, including one or more submarine reconfigurable optical add/drop multiplexers; one or more branching units (BUs) configured to receive one or more signals from one or more trunk terminals (TTs); one or more dummy light filters configured to pass useful signals through the one or more dummy light filters, and to reflect dummy light; one or more optical interleavers configured to separate the useful signals into two or more groups of optical channels; one or more optical channels set to a frequency of either a left portion or a right portion of a total channel bandwidth; one or more de-interleavers configured to merge signal groups together from two or more trunk terminals; and one or more lasers at each of one or more transponders at the one or more source terminals configured to adjust a destination of a channel by fine tuning a frequency or wavelength of the one or more signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As indicated above, there are several drawbacks to existing BU and submarine networks, but the system and method according to the present principles does not include the above-mentioned drawbacks. The system and method according to the present principles employs one or more optical interleavers and terminal wavelength planning/tuning to perform reconfiguration of channels in a network (e.g., submarine network). In one embodiment, there is no active device inside the branching units (BUs), and as such, the BU is completely passive, and does not consume any power, thereby ensuring improved reliability over existing systems, and there is no danger of the system failing because of a power outage.

In one embodiment, the system and method according to the present principles allows full reconfigurability, and employs only single fiber pairs in branch paths. Full system reconfiguration may be achieved by transponder laser fine tuning, interleaver interconnection, and/or an odd/even channel arrangement scheme according to the present principles.

The system and method according to the present principles also may advantageously provide for full reconfigurability (e.g., $2^K$, where K is a number of Wavelength Division Multiplexer (WDM) channels), zero power consumption at the BU (e.g., passive components in the undersea BU), high hardware reliability (components are passive and static), the ability to work in the event of a power failure, low hardware cost at the BU (e.g., only requires a small number of optical interleavers, as there may not be a need to generate a dummy light because it is recycled), low hardware cost at the branch path (e.g., reducing the fiber pair by half, reducing the number of repeaters by half), a secure system (e.g., no broadcasting, only the intended channel arrive at each terminal), and low and uniform optical loss in some embodiments. It is noted that repeater power may be balanced with recycled dummy light, and this may significantly reduce the quantity of dummy light and any related power consumption.

In one embodiment, only single fiber pair is employed for the branch link, which reduces the undersea cable and repeater cost significantly, and further reduces the installation and maintenance expense. The present principles also provide for full destination control at the source, at least because the switching is performed at the source node by fine adjustment of the wavelength, and do not require modification of the transponder hardware because all the existing transponders (either fixed wavelength or tunable wavelength) can support such fine wavelength tuning. The present principles also provide for a flexible network configuration at least because each terminal may function as a trunk terminal or a branch terminal, depending on the situation.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
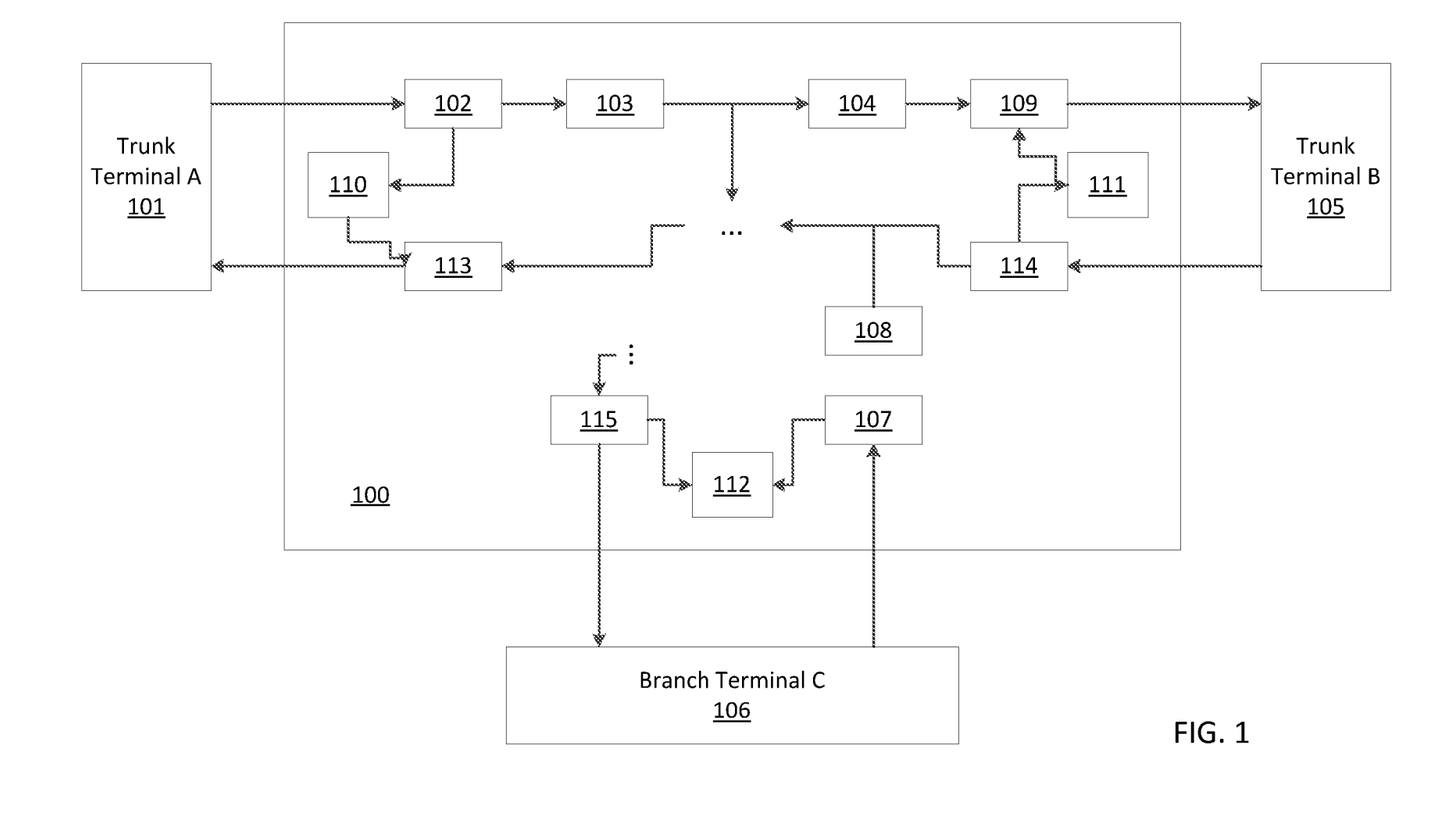
FIG. 1 is a high-level block/flow diagram of a system and method for data transport using a submarine reconfigurable optical add/drop multiplexing system with passive branching units in accordance with an exemplary embodiment of the present principles.

Referring now to the drawings in which like numerals represent the same or similar elements and initially to FIG. 1, a high-level system/method for a reconfigurable optical add/drop multiplexer (ROADM) with a reconfigurable branching unit which employs 1:2 interleavers/de-interleavers is illustratively depicted in accordance with the present principles. In one embodiment, all of the optical components inside a Branching Unit (BU) 100 may be completely passive (e.g., do not consume any power and do not require active control). This feature is advantageous, in particular for submarine undersea equipment, because the electrical power budget is generally strict for transoceanic links, and active electronic control is more difficult to perform and maintain.

In one embodiment, optical interleavers 103, 104, 108, which are components which may be employed in wavelength division multiplexing (WDM) optical networks to separate groups of optical channels with periodic spacing (e.g., free spectral range (FSR)) into two outputs; one containing odd channels and the other containing even channels, with doubled FSR. This is similar to a 1:2 symmetric comb filter, and interleavers may also be employed in the reverse direction to combine odd channel groups and even channel groups together (e.g., de-interleaver).

In another embodiment, 2:2 cyclic optical interleavers may be employed. This architecture may include two inputs, both including WDM channels with the same FSR. The cyclic interleaver may switch the odd and even channel groups among the two inputs in a cyclic faction, and may form two outputs with odd and even channel groups from both inputs. Another optical component that may be included is one or more optical filters 102, 107, 109, 113, 114, 115. This filter is generally a three port device. When employed in the separating direction, the optical filter may separate an input optical spectrum into two output portions at the through port and the reflected port, respectively (not shown).

In one embodiment, a portion of the optical spectrum in a submarine ROADM system is designated for dummy light (e.g., loading channels to maintain the full optical power in the transmission fiber). This portion of the optical spectrum may fall outside the useful WDM channel range, but may still be within the repeater's amplification range. The purpose of the optical filter in this instance may be to separate or combine the dummy light spectrum to the useful WDM channel spectrum. A passive, fixed, optical attenuator 110, 111 may be employed to maintain the power level between the signal light and dummy light in the branch path, and an optical coupler (not shown) may be employed to replace the optical filter for spectrum combining in one embodiment.

At the terminals 101, 105, 106, WDM transponders may be employed to enable wavelength tenability of sufficient power (e.g., a wavelength tenability of 50 GHz—for a setting of 100 GHz-spaced WDM system, and channel data rate of 100 Gb/s or less). It is noted that transponders in existing submarine networks generally include such transponders, and lasers, which may be employed as light sources, may be thermally tuned to any frequency (e.g., 50 GHz, 4 THz, etc.)

In one embodiment, two or more 1:2 interleavers/de-interleavers 103, 104, 108 (e.g., two for each terminal) may be employed according to the present principles. A cyclic interleaver is not necessary in this embodiment. A free spectral range (FSR) of the interleaver's input (e.g., the side with a single port) may be half of the channel spacing of the WDM network, while the FSR of the interleaver's outputs may be the same as the WDM network's channel spacing. For example, a common WDM system configuration may include 100 GHz spacing, with interleavers which are 50 GHz:100 GHz interleavers. For ease of explanation, we may assume that each WDM channel carries a standard amount of data for next generation submarine networks (e.g., 100 Gb/s data), but it is noted that the present principles may be applied to any number of channels and/or amount of data.

In one embodiment, at Trunk Terminal A 101, a frequency of each WDM channel may be set to either the left portion or the right portion within the channel bandwidth (e.g., left 50 GHz portion or right 50 GHz portion within a 100 GHz channel bandwidth). With a dual polarization quadrature phase shift keying (DP-QPSK) modulation format, which is most commonly used for 100 Gb/s long distance transmission, the necessary passband for each channel is less than 50 GHz in this illustrative example. For those channels that have Trunk Terminal B 105 as a destination, the frequencies may be shifted to fall within the left (odd) passband (e.g., 50 GHz passband), and for those channels that have Branch Terminal C 106 as a destination, the frequencies may be shifted to the right (even) passband (e.g., 50 GHz passband).

In addition to the spectrum for WDM signals, a different spectrum range may be reserved for loading light (e.g., dummy signal). Both the spectrum for the WDM signals and the spectrum for loading light may be within the repeater amplification range. As the total power of a loading light may be of interest, the detailed settings of a loading light (e.g., the number of peaks, peak spacing, individual amplitudes, etc.) are not critical, as long as they fall within a reasonable range. It is noted that employing fewer numbers of loading lights, each carrying more power than is customary, may reduce the number of light sources, and therefore help to reduce the required spectrum for loading light according to the present principles.

In one embodiment, when arriving at the BU, the WDM signals from Terminal A 101 (e.g., $O_A$, $E_A$, and $D_A$, representing odd channel group, even channel group, and dummy signal from Terminal A, respectively) may go through the dummy light filter 102 first, where the useful WDM signals (e.g., $O_A$, $E_A$) pass through, and the dummy light (e.g., $D_A$ is reflected). The through signals may be separated into odd and even paths by one or more interleavers 103. The group $O_A$ from the odd channel output may be sent to the input of one or more de-interleavers 104 for Trunk Terminal B 105, and it may include all the A=>B channels.

Similarly, the optical signals from Branch Terminal C 106 (e.g., $O_C$, $E_C$, and $D_C$) may pass through a filter 107 to separate the dummy light Dc, and may employ an interleaver 108 to separate the signals for Terminal A 101 and Terminal B 105, respectively. In one embodiment, the signals for Trunk Terminal B 105 may be on the even group $E_C$. A de-interleaver 104 may merge the signals from groups $O_A$ and $E_C$ together, and these signals may be all the useful signals (e.g., signals which carry data, non-dummy signals) from Terminal B 105. The signals may be sent to a dummy light filter 109, where they may be combined with dummy light $D_B$, which may be filtered from Terminal B's 105 input signal for a form signal (e.g., $O_A+E_C+D_B$).

A similar procedure may be performed for signals to Terminal A 101, which may include the even signal group from Terminal B ($E_B$), odd signal group from Terminal C ($O_C$), and the reflected dummy light ($D_A$) from its own input. A similar procedure may also be performed for signals to Terminal C 106, which may include the even signal group from Terminal B ($E_B$), odd signal group from Terminal C ($O_C$), and the reflected dummy light ($D_A$) from its own input.

In one embodiment, one or more optical attenuators 110, 111, 112 may be inserted in all the return paths before the reflected dummy light is added to the useful WDM signal. This may provide for a balance of optical power. Each of the useful WDM channels (e.g., $O_A$, $E_A$, $O_B$, $E_B$, $O_C$, $E_C$) may go through the interleaver/de-interleaver twice and the optical filters twice (at the through port), while the dummy lights only go through the optical filter twice (at the reflection port). The optical attenuator 110, 111, 112 may bring additional loss to balance the power between the WDM channels and the dummy light. Such attenuation value may be fixed, and thus fixed value attenuators are sufficient to employ according to the present principles. The filters 109, 113, 114 employed to combine the reflected dummy light and the useful output signal may be replaced by an optical coupler (not shown) to reduce the hardware cost, but that may cause slightly larger insertion loss.

In one embodiment, to change the destination of a channel, the source terminal may tune the frequency/wavelength of the signal between the odd and the even half of the channel passband. This is only a fine tuning (e.g., 50 GHz) and can be done easily, quickly, and efficiently by one of ordinary skill in the art. No switching or reconfiguration action is required in the BU, and all the hardware may be completely passive and static. The source terminal may control the tuning and the destination of each WDM channel. Because each channel is operated independently, there may be $2^k$ switching configurations at each source, where K is the number of WDM channels, and by combining the tuning configurations from all terminals, the quantity of achievable configurations in the entire BU increases further.

In the above exemplary embodiment, all of the three terminals have an equal configuration, regardless of whether they are a trunk or branch. This enables the network design to be more flexible, since any terminal may be assigned to be trunk or branch, while the same ROADM functions can still be achieved.

Figure 2:
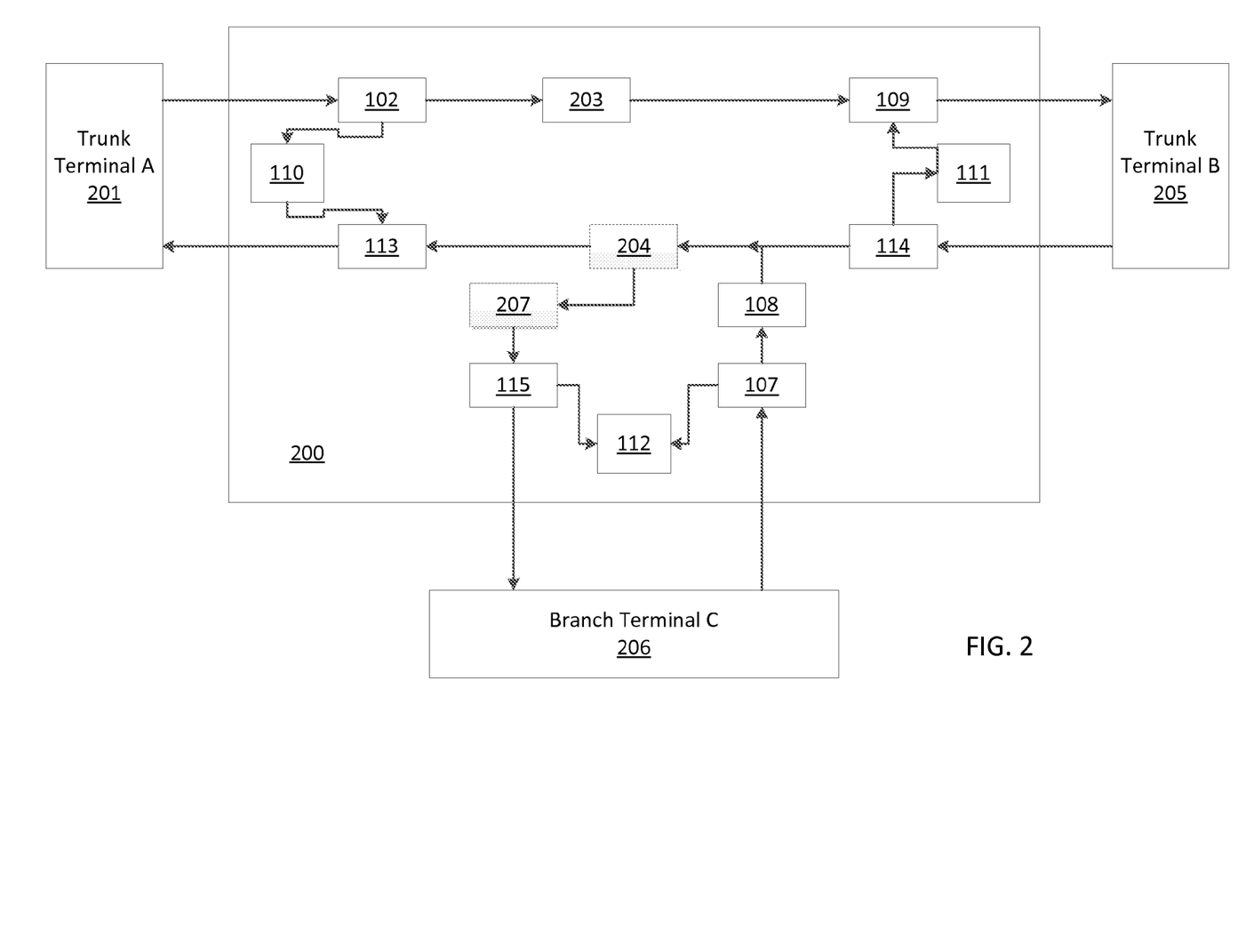
FIG. 2 is a high-level block/flow diagram of a system and method for data transport using a submarine reconfigurable optical add/drop multiplexing system with passive branching units in accordance with an exemplary embodiment of the present principles.

Referring now to FIG. 2, a high-level system and method for a reconfigurable optical add/drop multiplexer (ROADM) with a reconfigurable branching unit which employs 2:2 interleavers/de-interleavers is illustratively depicted in accordance with the present principles. In one embodiment, two interleavers/de-interleavers 203, 204 and two 2:2 cyclic optical interleavers 201, 202 for odd/even channel separation combination may be employed according to the present principles. A first 2:2 cyclic interleaver 203 may take the $O_A$, $E_A$ signals from Trunk Terminal A 201 at one input, and the interleaved $E_C$ from Branch Terminal C 206 at the second input, and may perform cyclic interleaving functions. The first output includes $O_A+E_C$, may be the signals for Trunk Terminal B 205. This signal may be sent to a dummy light filter to add the reflected dummy light $D_B$ to form the optical signal for Terminal B 205. The second output may include the $E_A$ signal, whose destination may be Branch Terminal C 206.

The second cyclic interleaver 204 may perform the same function at the reverse path from Terminal B 205 to Terminal A 201. It may take $O_B$ and $E_B$ from Terminal B 205, and $O_C$ from Terminal C 206, to form $O_C+E_B$ for Terminal A 201 and $O_B$ for Terminal C 206. The de-interleaver 207 for Terminal C 206 may combine the $E_A$ from the first 2:2 cyclic interleaver 203 and $O_B$ from the second 2:2 cyclic interleaver 204, to form $O_B+E_A$ for Terminal C 206. It is noted that the remaining components, the odd/even assignment, and the reconfiguration operation may be substantially identical to those for the above-mentioned embodiment including 1:2 interleavers/de-interleavers in FIG. 1.

It is noted that in some embodiments, the hardware for the connection between trunk terminals and the hardware for the connections between trunk and branch terminals may be different, but the function may still be the same, even with the different hardware. As such, the present principles may be adapted to any hardware configuration, and therefore includes a high degree of flexibility in network design and network compatibility.

Since the transmission distance in the submarine network is generally long, the number of amplification stages is greater than the terrestrial network in some embodiments, and the power balancing (e.g., equalization) at the amplifier (e.g., repeater) is more critical. The optical amplifiers used in the submarine network are specifically designed for system with certain number of WDM channels (e.g., the full system). Therefore if some WDM channels are dropped at the BU, dummy light with the equal power level may be inserted to maintain the constant total power among all channels. Or, if some channels from the terminal transmitter do not carry a useful signal, dummy loading light may be added.

It is possible that all the channels in the main trunks and branch path are fully occupied. For example, each source-destination pair may have traffic that occupies 50% of the maximum channel count (e.g., 20 channels between A ↔ B, A ↔ C, and B ↔ C in a WDM system with 40 wavelengths). However this is only one special case. For general ROADM application, the channel assignment may change over time based on network planning. It is noted that different sorts of channel assignments (e.g., trunk heavy, branch heavy, etc.), may be employed according to the present principles.

In many submarine networks, the main trunks have more traffic than the branch paths, and this situation is called 'trunk heavy'. In other words, the traffic from a trunk terminal to a branch terminal does not exceed half of the channel capacity in the WDM system. For example, in a 40-channel WDM system, the traffic between a trunk terminal (such as A) and branch terminal (such as C) will not exceed 20 channels. This trunk heavy case can further be divided into two subcases.

In the first subcase according to the present principles, the main trunks may be fully occupied with useful WDM channels (e.g., at the output of Trunk Terminal A, all WDM channels are present, and each one either goes to Trunk Terminal B or to Branch Terminal C). Under such conditions, no dummy channel is necessary on the main trunk, therefore the dummy light filters (e.g., 102, 113, 109, and 115 in FIG. 1) and the optical attenuator (e.g., 110 and 111 in FIG. 1) at each trunk input/output of the BU can be eliminated. This can serve to simplify the overall system architectures. Since the insertion loss for the signal between the main trunk terminals is thus reduced, optical attenuators (not shown) may be placed for power balancing between trunk ↔ trunk and trunk ↔ branch signals.

In comparison to conventional BU architectures, the present principles reduce the number of dummy light requirements by more than half, at least because of the combining of two branching path fiber pairs. Such reduction of dummy light leads to much lower hardware cost and power consumption than is necessary when using conventional BU architectures.

In a second subcase according to the present principles, the main trunk is not fully occupied, and the traffic between the branch terminal and each of the trunk terminal does not exceed half of the WDM channel capacity. In this case, a dummy channel can be added at the trunk terminals, and the all the existing architectures can also support such channel assignments.

In one embodiment, there may be two schemes to provide repeater power balance in the above subcase. The first is to use the full architectures with dummy light from the trunk terminals, and the second scheme uses simplified architectures, but instead of using dummy lights inside the loading light spectrum, the dummy lights for the main trunk A ↔ B may be placed at the unused channels in the main trunk (e.g., $O_A$ and $E_B$). It is also possible to put the dummy lights at the same odd/even grid inside the loading light spectrum according to the present principles, as long as that the optical interleavers can also operate with that spectrum.

In another embodiment, as submarine network traffic becomes more dynamic, some branches may carry a heavier load than others. This situation may be referred to as 'asymmetric branch heavy'. In other words, the traffic between a trunk terminal and the branch might be more than the traffic between this trunk terminal and the other trunk terminal (e.g., A ↔ C traffic exceeds A ↔ B traffic), and may be more than half of the WDM channel capacity. In this case, the present principles may be employed to achieve significant dummy light savings, and the system/method according to the present principles does not necessarily have a distinction between trunk and branch terminals, any traffic load balance setting among the terminals and the transmission links can be handled efficiently.

It is noted that much of the traffic in submarine WDMs may be duplex with symmetric capacity between two transmission directions (e.g., the amount of traffic in A=>B is the same as B=>A, and similarly A=>C is same as C=>A, and B=>C is the same as C=>B), and the system/method according to the present principles can be employed for asymmetric duplex traffic arrangements, and for any other sort of traffic arrangements or network architectures in accordance with the present principles.

Figure 3:
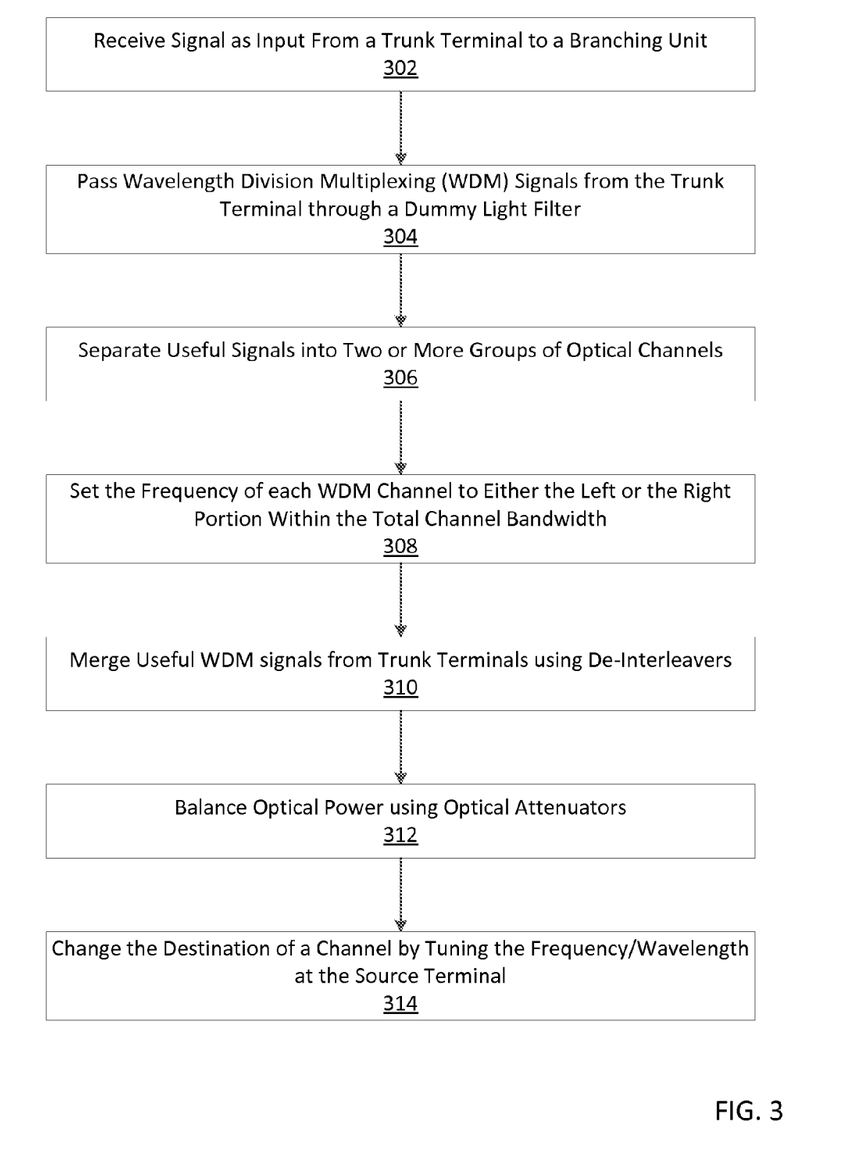
FIG. 3 is a flow diagram of a system and method for data transport using a submarine reconfigurable optical add/drop multiplexer with passive branching units in accordance with an exemplary embodiment of the present principles.

Referring now to FIG. 3, a block/flow diagram for data transport using a submarine reconfigurable add/drop multiplexer (ROADM) with a passive branching unit (BU) is illustratively depicted in accordance with the present principles. In one embodiment, a signal is received as input from a Trunk Terminal to the BU in block 302, and the WDM signals from the Trunk Terminal may pass through a dummy light filter in block 304, wherein the useful WDM signals may pass through, and the dummy light may be reflected.

The useful signals that pass through may be separated into two or more groups of optical channels using one or more optical interleavers in block 306 (e.g., even, odd). It is noted that the free spectral range (FSR) of the separated signals may be doubled in some embodiments (e.g., using a 1:2 interleaver) in comparison to the originally input signal. It is further noted that 2:2 cyclic optical interleavers may also be employed according to the present principles, and in this instance, there may be at least two inputs, and both may include WDM channels with the same FSR.

After the signal is separated, the frequency of each WDM channel may be set to either the left portion or the right portion within the total channel bandwidth in block 308, and a different spectrum range may also be reserved for loading light (e.g., dummy signal). One or more de-interleavers may merge the signal groups together such that the useful WDM signals from various Trunk Terminals are merged in block 310. One or more optical attenuators may be employed before the previously reflected dummy light is added into the useful WDM signal to provide a balance of optical power in block 312. The recycling of the previously reflected dummy light may be performed through the dummy light filters and/or attenuator path.

To change the destination of a channel, the frequency/wavelength of the signal between the odd and the even half of the channel passband may be tuned at the source terminal in block 314, and no switching or reconfiguration is required in the BU to change the destination in accordance with the present principles. The above tuning in block 314 may be performed at each transponder each time data is sent from a terminal to a branching unit according to various embodiments. In one embodiment, switching the channel to different destinations is performed by the fine tuning of one or more lasers at one or more transponders at the source terminal. It is noted that the system/method according to the present principles is a non-broadcasting architecture (e.g., only intended signals will reach the destination), and also that by sharing of the branch path fiber pair between the signal to/from trunk terminals reduces the branch fiber pair and repeater by at least half in comparison to conventional systems.

A1. Describe the problem that the present invention attempts to solve. It is noted that submarine optical networks form the backbone of global communication networks. Submarine optical networks usually consist of main trunks that connect the trunk terminals, which are point-to-point cable links with in-line optical amplifiers to boost the signal power, and branch path that connect to other branch terminals. A branching unit (BU) is a network element that splits the signal between the main trunk and the branch path and vice versa. This allows the signals from different paths to share the same fiber, instead of installing dedicate fiber pairs for each link. The signal splitting and combining function of the BU is usually performed optically, therefore the BU has the similar function as the optical add/drop multiplexer (OADM) in the terrestrial WDM networks.

Conventional submarine communication systems may include, for example, two trunk terminals, one branch terminal and one BU that links the main trunk with the branch path. Bidirectional fiber transmission is illustrated. Note that there are there are two pairs of fiber between the BU and the branch terminal. One pair is used to connect Trunk Terminal 1 to the branching terminal, while the second pair is used between Trunk Terminal 2 and the branch terminal. This allows the reuse of the same wavelengths in the TT1-BT path and the TT2-BT path.

Conventional BU and the submarine network have fixed, pre-determined wavelength arrangement, therefore no reconfiguration is required. However, the traffic in the global communication network is becoming more dynamic as Internet-based traffic becomes more dominating. Therefore the wavelength reconfigurability is required for the next generation submarine network, with reconfigurable BU as the key enabling element.

In some embodiments, this invention focuses on how to add reconfigurability to the submarine network BU effectively to achieve reconfigurable optical add/drop multiplexing (ROADM) function between the main trunk and branch path in submarine network, while still maintaining the required features for the BU such as amplifier power balancing, low/no power consumption, high hardware reliability, compact size, data security, hardware cost saving, etc.

A2. How have others attempted to solve the problem described in A1? Most of the BUs in current submarine networks have fixed wavelength configuration and do not allow any reconfigurability after hardware deployment. They use optical splitters/couplers and fixed optical add/drop filters to perform the branching function. The benefit is that the hardware inside the BU is completely passive, therefore does not consume any power, can continue to operate even during power failure in the submarine link, and has better reliability due to no moving part. It uses one fiber pair for each main trunk, and two fiber pairs for the branch path, and has the broadcast-and-select architecture through the optical splitter at the inputs from the main trunks. While having the potential benefit of signal multicasting, such broadcast-and-select architecture poses a potential security issue, since the branch can receive all input channels. It is up to the branch terminal to voluntarily filter out and discard the channels that are not assigned to it. Since submarine networks usually connect multiple countries, the possibility of a branching terminal (country) receiving non-designated data (between other countries) is a serious security risk and should be prevented.

To reduce such risk of broadcasting and to reduce the number of fiber pairs in the branch path, an architecture using 4-port optical add/drop multiplexer was proposed. It also has the benefit of recycling the dummy light at the unused channels in the branch path, and is also completely passive. However it is also a fixed, non-reconfigurable BU.

To add reconfigurability and to turn the BU into a submarine network ROADM, the first and most straightforward method is to replace the fixed wavelength optical filters in the current BU with tunable optical filters. By changing the passband and stop band wavelength ranges, different amount of optical spectrum can be passed to different terminals according to the requirement. Some issues with this scheme include limited configurations (about the number of channels, typically 40 or 80), restriction of contiguous wavelengths for the same destination, moving part, and slow tuning speed (typically). Some tunable optical filter technologies have latching capability, i.e., the switches will maintain their switching setting even after the power is turned off or cut.

Due to the physical location and environment, the time and effort to repair damages in submarine networks is much greater than in the terrestrial network. It is thus desirable for the optical switches in the BU to have latching feature. This feature can also reduce the power consumption in the BU, which is highly desirable.

Another architecture to add reconfigurability is to replace the single optical filter with an array of N filters, and to use 1×N optical switches to select the appropriate one. Compared to the tunable filter-based BU, this BU architecture has faster reconfiguration time, because the switching speed in an optical switch is usually faster than the tuning speed of tunable filter, especially if the tuning is based on mechanical tuning, which is used in most latching type tunable filters. However, this design only allows N pre-determined configurations, so the quantity of BU configuration is limited (typically up to 1×16), and the physical size gets larger as N increases.

In an earlier invention, we proposed a WSS (wavelength-selective switch)-based reconfigurable BU, as illustrated in. This is a "fully reconfigurable" BU architecture, since it allows independent switching of individual channels, therefore offers significantly higher level of reconfigurability compared to the prior arts ($2^K$, where K is the number of WDM channels. For example, in a 40-channel WDM system, there can be >1 trillion configurations). A major drawback of this architecture is that currently there is no latching WSS or wavelength blocker (WB) available in the market. WSS also adds control complexity to the BU.

We also proposed a bidirectional DSM (demultiplexer-switch-multiplexer) reconfigurable BU that offers higher degree of flexibility than the filter array-based architecture ($2^B$, where B is the number of wavebands. For a 10-waveband system, the number of configurations is 1024) and can be constructed using latching devices. It is based on array of 2×2 switches and waveband/wavelength multiplexers/demultiplexers. It also has the feature of recycling dummy lights, and does not have signal broadcasting issue. The issues include requiring larger amount of switches, and cannot provide full reconfigurability.

In another invention, we proposed a split-and-select DSM reconfigurable BU architecture. It is based on array of 1×2 switches and waveband/wavelength multiplexers/demultiplexers, optical splitters, and WB. It offers same degree of flexibility as the bidirectional DSM architecture (>1000 configurations for a 10-waveband system). The BU can be constructed using latching devices, the non-latching component WB is located at the branch terminal, therefore is acceptable. It uses few components inside the BU, compared to the bidirectional DSM architecture, and can allow multicasting. However its drawbacks include no full reconfigurability, cannot recycle dummy lights, and the signal security issue related to the broadcasting architecture.

A3. How does the invention solve the problem described in A1? The current invention uses optical interleaver and terminal wavelength planning/tuning to perform reconfiguration of channels in the submarine network. It does not have any active device inside the BU, therefore it's completely passive, does not consume any power, has good reliability, and does not suffer from power failure issue. It allows full reconfigurability, and uses only single fiber pair in the branch path. The key technologies to achieve full system reconfiguration include the odd/even channel arrangement scheme, transponder laser fine tuning, and interleaver interconnection.

In some embodiments, specific competitive/commercial value of the solution achieved by the present invention (e.g., less complexity, faster operation, lower cost, higher quality, etc.) may include, for example, at least the following advantage over conventional systems: Full reconfigurability ($2^K$, where K is the number of WDM channels);

Zero power consumption (passive components in the BU);

High hardware reliability (passive components in the BU);

Power failure proof (passive components in the BU);

Low hardware cost at the BU (only requiring a few optical interleavers, no need to generate dummy light because it is recycled);

Low hardware cost at the branch path (reducing the fiber pair by half, reducing the costly repeaters by half too);

Secure (no broadcasting, only intended channel arriving each terminal); and/or

Low and uniform optical loss.

If used in, for example, NEC's submarine system product, the present system and method will enable data transport with lower hardware and operation cost, improved performance and reliability, and better controllability and security.

DESCRIBE THE INVENTION

In one embodiment, 2 reconfigurable branching unit (i.e. submarine ROADM) architectures are proposed. They are based on similar idea, however with different components and configurations.

Key Components

All the optical components inside the branching unit are completely passive, which means that they do not consume any power, and do not require active control. This is a big advantage for submarine undersea equipment, because the electrical power budget is tight for the transoceanic link, and the active electronic control is more difficult to perform and maintain.

In some embodiments, a main optical component is an optical interleaver. It is a component commonly used in wavelength division multiplexing (WDM) optical network to separate a group of optical channels with periodic spacing (called free spectral range or FSR) into 2 outputs, one containing odd channels and the other containing even channels, with doubled FSR. Essentially it is a 1:2 symmetric comb filter. Interleaver can also be used in the reverse direction to combine odd channel groups and even channel groups together (sometimes this is called de-interleaver). The technology for optical interleaver is very mature, and the products are widely available.

In one embodiment, a second architecture may be employed according to the present principles, and 2:2 cyclic optical interleavers are used. It contains 2 inputs, both containing WDM channels with the same FSR. The cyclic interleaver switches the odd and even channel groups among the 2 inputs in a cyclic faction, and forms two outputs with odd and even channel groups from both inputs. 2:2 cyclic interleaver is also commonly available.

Another optical component which may be used is an optical filter. It may be a 3 port device. When used at the separating direction, it separates an input optical spectrum into two output portions at the through port and the reflected port, respectively. The spectrum separation is according to the pre-configured filter design. When used at the combining direction, it combined two inputs with different spectrum components into a combined output. Optical filter is also a widely available product, and is also a key component in the current fixed wavelength BU (the add/drop filter).

In some embodiments of the submarine ROADM systems according to the present principles, a portion of the optical spectrum is designated for dummy light, which are loading channels to maintain the full optical power in the transmission fiber. This spectrum portion falls outside the useful WDM channel range, but is still within the repeater's amplification range. The purpose of the optical filter here is to separate or combine the dummy light spectrum to the useful WDM channel spectrum. More details will be described herein below.

In some embodiments, one or more passive fixed optical attenuators can also be used to maintain the power level between the signal light and dummy light in the branch path. Optional optical coupler can be used to replace optical filter for spectrum combining.

At the terminals, the WDM transponders may have wavelength tenability of 50 GHz (for the most common setting of 100 GHz-spaced WDM system, and channel data rate of 100 Gb/s or less, see more explanation below). The transponders in all submarine networks have such capability. For older products where DFB lasers are used as the WDM light source, the laser frequency can be thermally tuned for more than 50 GHz range. For newer product, the laser frequency can be tuned across the entire transmission range (typically 4 THz or more).

Figure 4:
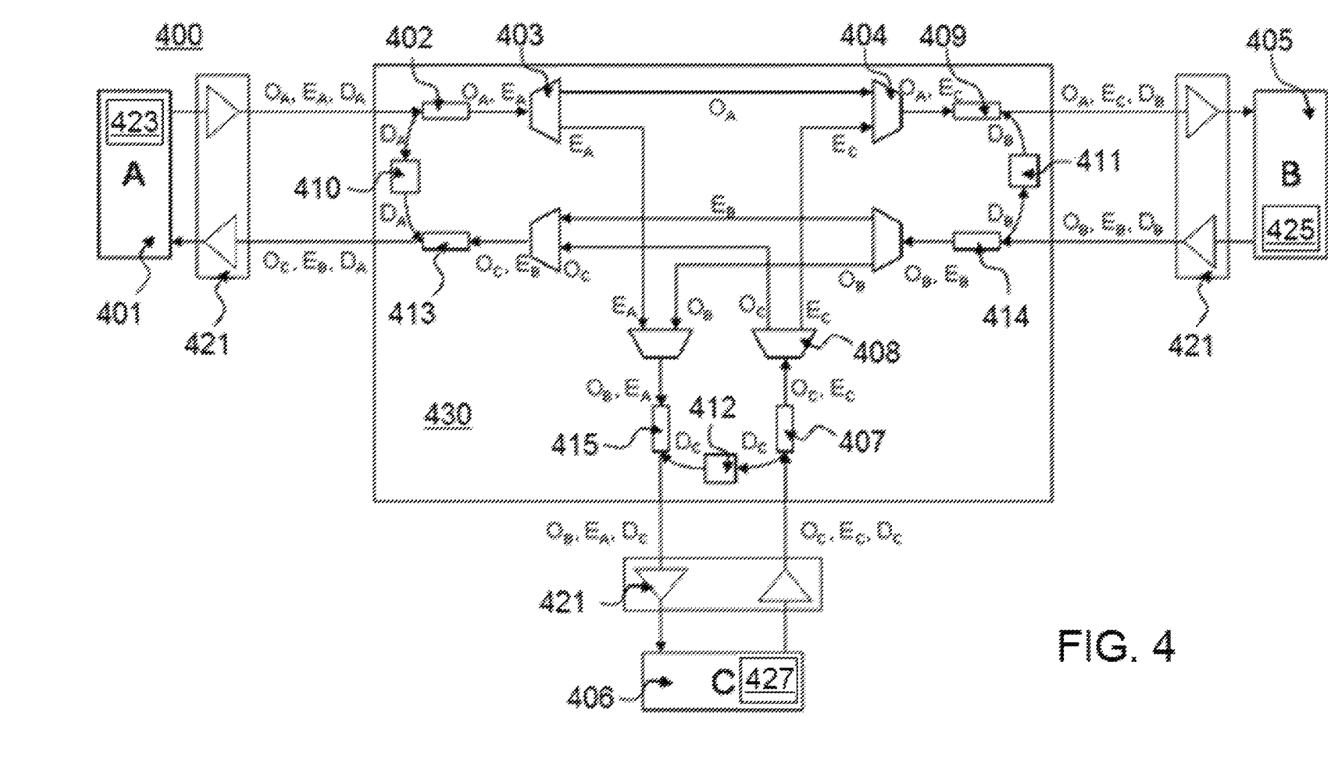
FIG. 4 is a block/flow diagram of a system and method for data transport using a submarine reconfigurable optical add/drop multiplexing system with passive branching units in accordance with an exemplary embodiment of the present principles.

Architecture 1:

Referring now to FIG. 4, a block/flow diagram of a system and method for data transport using a submarine reconfigurable optical add/drop multiplexing system (ROADM) 400 with passive branching units is illustratively depicted in accordance with an exemplary embodiment of the present principles.

In one embodiment, the ROADM according to the present principles may use 6 units of 1:2 interleaver/de-interleaver, two for each terminal. It does not require cyclic interleaver. The FSR of the interleaver's input (the side with single port) is half of the channel spacing of the WDM network, while the FSR of the interleaver's outputs is the same as the WDM network's channel spacing. In the most common case, the WDM system have 100 GHz spacing, and the interleavers are 50 GHz:100 GHz interleavers. These are also the figures that will be used in the following description. For ease of illustration, we also assume that each WDM channel carries 100 Gb/s data, which is the most common setting for next generation submarine network.

At the trunk terminal (such as Terminal A, 401), the frequency of each WDM channel is set to either the left 50 GHz portion or the right 50 GHz portion within the 100 GHz channel bandwidth. With the DP-QPSK (dual polarization quadrature phase shift keying) modulation format, which is most commonly used for 100 Gb/s long distance transmission, the required passband for each channel is less than 50 GHz. Field experiment has shown that 36 GHz spacing is sufficient to transmit the signal at long distance without much penalty. For those channels that have Trunk Terminal B 405 as the destination, the frequencies are shifted to fall within the left (odd) 50 GHz passband; and for those that are for Branch Terminal C 406, the frequencies are shifted to the right (even) 50 GHz passband. Besides the spectrum for WDM signals, a different spectrum range is reserved for loading light (dummy signal). Both the spectrum for the WDM signals and the spectrum for loading light are within the repeater amplification range.

Since in some embodiments, we are only interested in the total power level of the loading light, the detailed settings of the loading light, such as the number of peaks, peak spacing, and the individual amplitudes, etc., are not critical, as long as they fall within the reasonable range. It's a common practice to have fewer number of loading light but each carrying more power. This will reduce the number of light source. In our proposals, this helps to reduce the required spectrum for loading light.

When arriving at the BU, the WDM signals from Terminal A ($O_A$, $E_A$, and $D_A$, representing odd channel group, even channel group, and dummy signal from Terminal A) may pass through an optical repeater 421, and go through the dummy light filter (402) first, where the useful WDM signals ($O_A$ and $E_A$) pass through, and the dummy light ($D_A$) are reflected. The through signals are separated into odd and even paths by an interleaver (403). The group $O_A$ from the odd channel output is sent to the input of a de-interleaver (404) for Trunk Terminal B (405), it contains all the A=>B channels.

Similarly, the optical signals from Branch Terminal C (406), $O_C$, $E_C$, and $D_C$, passes through a filter (407) to separate the dummy light Dc, and uses an interleaver (408) to separate the signals for Terminal A 401 and Terminal B 405 respectively. Here, the signals for Trunk Terminal B 405 are on the even group $E_C$. The de-interleaver 404 merges the signals groups $O_A$ and $E_C$ together, these are all the useful WDM signals for Terminal B 405. They are sent to a dummy light filter (409), where they are combined with dummy light $D_B$ filtered from Terminal B 405 input signal for form signal $O_A+E_C+D_B$, and transmitted to Terminal B 405 through the main trunk.

Similar procedure is performed for signals to Terminal A 401, which includes the even signal group from Terminal B 405 ($E_B$), odd signal group from Terminal C 406 ($O_C$), and the reflected dummy light $D_A$ from its own input.

Similar procedure is performed for signals to Terminal C 406 too, which includes the even signal group from Terminal A 401 ($E_A$), odd signal group from Terminal B 405 ($O_B$), and the reflected dummy light Dc from its own input.

In all the return paths, an optical attenuator (410, 411, 412) is inserted before the reflected dummy light is added to the useful WDM signal. This is to provide balance of optical power. Each the useful WDM channels ($O_A$, $E_A$, $O_B$, $E_B$, $O_C$, $E_C$) goes through the interleaver/de-interleaver twice and the optical filters twice (at the through port), while the dummy lights only go through the optical filter twice (at the reflection port). The optical attenuator brings additional loss to balance the power between the WDM channels and the dummy light. Such attenuation value is fixed, therefore fixed value attenuators are sufficient. The filters (409, 413, and 414) to combine the reflected dummy light and the useful output signal can also be replaced by optical coupler to reduce the hardware cost (but will cause slightly larger insertion loss).

In one embodiment, switching the channel to different destinations is performed by the fine tuning of one or more light sources (e.g., lasers) 423, 425, 427 at one or more transponders at one or more of the source terminals (e.g., 401, 405, 406). It is noted that the system/method according to the present principles is a non-broadcasting architecture (e.g., only intended signals will reach the destination), and also that by sharing of the branch path fiber pair between the signal to/from trunk terminals reduces the branch fiber pair and repeater by at least half in comparison to conventional systems.

To change the destination of a channel, the source terminal (e.g., 401, 405, 406) can simply tune the frequency/wavelength of the signal between the odd and the even half of the channel passband, as shown in Table I below. This is only a fine tuning (e.g. 50 GHz) and can be done easily, quickly and efficiently. No switching or reconfiguration action is required in the BU 430, all the hardware are completely passive and static. The source terminal controls the tuning and the destination of each WDM channel.

TABLE I

Channel group assignment for different source-destination connection

| From Terminal | To Terminal | Group |
|---|---|---|
| A | B | $O_A$ |
| A | C | $E_A$ |

TABLE I-continued

Channel group assignment for
different source-destination connection

| From Terminal | To Terminal | Group |
|---|---|---|
| B | A | $E_B$ |
| B | C | $O_B$ |
| C | A | $O_C$ |
| C | B | $E_C$ |

Since each channel is operated independently, there can be $2^K$ switching configurations at each source, where K is the number of WDM channels. Combing the tuning configurations from all terminals, the quantity of achievable configurations in the entire BU 430 is even higher.

In this architecture, all the 3 terminals have the equal configuration, regardless of trunk or branch. It makes the network design more flexible, since any terminal can be assigned to be trunk or branch, and same ROADM function can be achieved.

Figure 5:
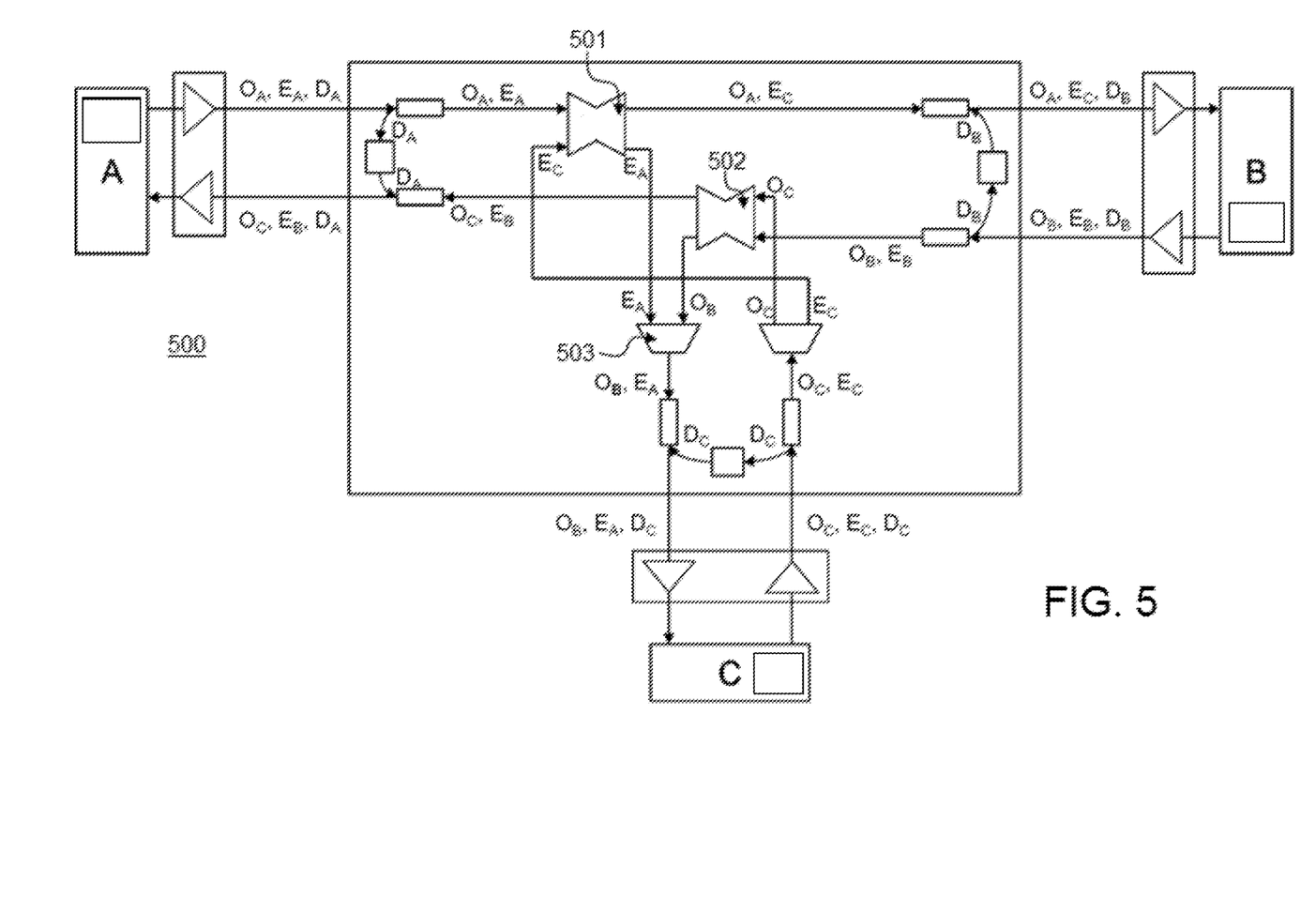
FIG. 5 is a block/flow diagram of a system and method for data transport using a submarine reconfigurable optical add/drop multiplexing system with passive branching units in accordance with an exemplary embodiment of the present principles.

Architecture 2:

Referring now to FIG. 5, with continued reference to FIG. 4, a block/flow diagram of a system and method for data transport using a submarine reconfigurable optical add/drop multiplexing system (ROADM) 500 with passive branching units is illustratively depicted in accordance with an exemplary embodiment of the present principles. In this embodiment, instead of 6 interleavers/de-interleavers (e.g., 403, 404, 408), it uses two interleavers/de-interleavers (503) and two 2:2 cyclic optical interleavers 501, 502 for odd/even channel separation/combination. For simplicity of illustration, only those components of the ROADMs which are different in FIG. 5 as compared to FIG. 4 will be described in detail with respect to FIG. 5.

In one embodiment, the first 2:2 cyclic interleaver (501) takes the $O_A$, $E_A$ signals from Trunk Terminal A 401 at one input, and the interleaved $E_C$ from Branch Terminal C 406 at the second input, and performs cyclic interleaving function. The first output contains $O_A+E_C$, which are the signals for Trunk Terminal B 405. This signal is sent to the dummy light filter to add the reflected dummy light $D_B$ to form the optical signal for Terminal B 405. The second output contains only $E_A$ signal, whose destination is Branch Terminal C 406.

In one embodiment, the second 2:2 cyclic interleaver (502) performs the same function at the reverse path from Terminal B 405 to Terminal A 401. It takes $O_B$ and $E_B$ from Terminal B 405, and $O_C$ from Terminal C 406, to form $O_C+E_B$ for Terminal A 401, and $O_B$ for Terminal C 406. The de-interleaver (503) for Terminal C 406 combines the $E_A$ from the first 2:2 cyclic interleaver 501 and $O_B$ from the second 2:2 cyclic interleaver 502, to form $O_B+E_A$ for Terminal C 406.

It is noted that the remaining components, the odd/even assignment, and the reconfiguration operation, etc. are the same as the first architecture described with respect to FIG. 4.

In some embodiments, the hardware for the connection between trunk terminals and the hardware for the connections between trunk and branch terminals are different, however the function and the same, therefore it also offers the network design flexibility.

Repeater Power Balance:

In one embodiment, since the transmission distance in the submarine network is long, the number of amplification stages is greater than the terrestrial network. Thus, the power balancing (equalization) at the amplifier (repeater) 421 is more critical. The optical amplifiers used in the submarine network are specifically designed for system with certain number of WDM channels (most likely the full system). Therefore if some WDM channels are dropped at the BU 430, dummy light with the equal power level need to be inserted to maintain the constant total power among all channels. Or if some channels from the terminal transmitter do not carry useful signal, dummy loading light needs to be added.

It is possible that all the channels in the main trunks and branch path are fully occupied (for example, each source-destination pair has traffic that occupies 50% of the maximum channel count, such as 20 channels between A⇔B, A⇔C, and B⇔C in a WDM system with 40 wavelengths). However this is only one special case. For ROADM application, the channel assignment changes over time based on network planning. Different cases of channel assignment, including trunk heavy and branch heavy cases, are analyzed and compared below.

Case 1: Trunk Heavy

In most submarine networks, the main trunks have more traffic than the branch paths. In other words, the traffic from a trunk terminal to a branch terminal does not exceed half of the channel capacity in the WDM system. For example, in a 40-channel WDM system, the traffic between a trunk terminal (such as A) and branch terminal (such as C) will not exceed 20 channels. We can further divide this case into two subcases.

In the first subcase, the main trunks are fully occupied with useful WDM channels (for example, at the output of Trunk Terminal A, all WDM channels are present, and each one either goes to Trunk Terminal B 405 or to Branch Terminal C 406.). In fact, most of the existing BU architectures published so far assume this condition.

Under such condition, no dummy channel is required on the main trunk, therefore the dummy light filters (402, 413, 409, and 415) and the optical attenuator (410 and 411) at each trunk input/output of the BU 430 can be eliminated. Thus, the 2 previously described architectures (e.g., FIGS. 4 and 5) will then be simplified. Since the insertion loss for the signal between the main trunk terminals is thus reduced, optional optical attenuators can be placed for power balancing between trunk⇔trunk and trunk⇔branch signals according to various embodiments.

Comparing to other BU architectures, the system and method according to the present principles reduces the number of dummy light requirements by more than half, due to the combining of two branching path fiber pairs. Such reduction of dummy light leads to saving of hardware cost and power consumption.

In the second subcase, the main trunk is not fully occupied, but the traffic between the branch terminal and each of the trunk terminal does not exceed half of the WDM channel capacity, then dummy channel can be added at the trunk terminals, and the all the existing architectures can also support such channel assignments.

In some embodiments, using our previously described architectures, there are two schemes to provide repeater power balance in this subcase. The first is to use the full architectures, with dummy light from the trunk terminals. The second scheme uses the simplified architectures, but instead of using dummy lights inside the loading light spectrum, the dummy lights for the main trunk A⇔B are placed at the unused channels in the main trunk (such as $O_A$ and $E_B$). It is also possible to put them at the same odd/even grid inside the loading light spectrum, as long as that the optical interleavers can also operate with that spectrum. In this subcase, same dummy light saving is available by these architectures.

Case 2: Asymmetric Branch Heavy

In one embodiment, as the submarine network traffic patterns becoming more dynamic, it is possible that some branch might have heavier load. In other words, the traffic between a trunk terminal and the branch might be more than the traffic between this trunk terminal and the other trunk terminal (such as A⇔C traffic exceeds A⇔B traffic), and might be more than half of the WDM channel capacity.

In such case, the two simplified architectures cannot be used. The two full architectures described above, however, can support such a case. Among them, the proposed architectures again show significant dummy light saving.

As discussed earlier, the 2 previously described architectures can be used for more general network arrangements than any conventional systems. Since they may not have a distinction between trunk and branch terminals, any traffic load balance setting among the terminals and the transmission links can be handled efficiently.

It may be assumed that the traffic in the submarine WDM is duplex with symmetric capacity between two transmission directions, which means that the amount of traffic in A=>B is the same as B=>A, similarly A=>C same as C=>A, and B=>C same as C=>B. While some prior arts require such restriction, the previously described architectures according to various embodiments of the present principles can handle asymmetric duplex traffic arrangements also.

It is noted that a central feature of this invention is the architecture of submarine ROADM. Some key points are:

The scheme to use odd and even channel to separate the signals to different destinations.

The method to use fine tuning of laser at each transponder at the source terminal to switch the channel to different destinations.

The designated portion of the spectrum for dummy light, which does not occupy the useful signal spectrum, but still falls within the spectrum that can be amplified by the repeater.

The 2 architectures for the undersea branching unit, which are completely passive. Their components include optical interleaver, cyclic optical interleaver, optical filter, optical attenuator, and optional optical coupler. Therefore it does not require control circuit at the BU.

The assignment of odd/even channel and the interconnections among the interleavers to achieve switching among different terminals, with 2 variations, as shown in the 2 architectures.

The recycling of dummy light through the dummy light filters and attenuator path.

The sharing of the branch path fiber pair between the signal to/from both trunk terminals, which reduces the branch fiber pair and repeater by half.

The non-broadcasting architecture, where only the intended signals will reach the destination.

The simplified architectures which reduce the hardware components even further.

In summary, the proposed submarine ROADM architectures have many key benefits:

Fully reconfigurable in all channels, delivering $2^K$ configurations for each source terminal, where K is the number of WDM channels Zero power consumption at the undersea BU, since all components are passive and static High reliability, since the components are passive and static, and have mature technology Maintaining network configuration even during power failure Repeater power balance with recycled dummy light, which significantly reduce the quantity of dummy light and the related power consumption Uses only single fiber pair for the branch link, reducing the undersea cable and repeater cost significantly, and reducing the installation and maintenance expense Secure information delivery, since it does not use broadcasting. No unintended signal will reach the destination Full destination control at the source, since the switching is performed at the source node by slight adjustment of the wavelength Does not require modification of the transponder hardware, since all the existing transponders (either with fixed wavelength or tunable wavelength) can support such fine wavelength tuning Flexible network configuration, since each terminal can function as a trunk terminal or a branch terminal Compact size: the BU only require a small number of passive components, it can be made in a very compact form factor Low insertion loss: In the full configuration, each optical channel experiences $2 \times L_{IL} + F2 \times L_{F\_T}$ or $L_{CIL} + 2 \times L_{F\_T}$, ($L_{IL}$ is the insertion loss of the 1:2 interleaver, $L_{CIL}$ is the insertion loss of a 2:2 cyclic interleaver, and $L_{F\_T}$ is the insertion loss of the through channel of the optical filter), which is typically ~5 dB. For the simplified architectures, the insertion loss is even lower.

Low cost: All the optical components are simple, passive, mass produced, and therefore are low cost. Passive BU also means that there is no need for control circuit and electronics, further reducing the cost. The low insertion loss also makes it possible to reduce or eliminate amplification in the BU, which will also reduce the hardware and operation cost.

It is noted that the present system and method include several advantages over conventional systems and methods, which may be achieved by, for example, using the combination of full reconfigurability with passive BU, the use of interleavers and odd/even channel arrangement, as described in further detail above.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport using one or more submarine reconfigurable optical add/drop multiplexing systems, comprising:

wherein the optical spectrum is separated into a wavelength division multiplexed (WDM) signal spectrum for WDM signals, and a loading light spectrum, and wherein the WDM signal spectrum is alternating odd and even channels;

tuning a laser wavelength at the transmitter at a trunk terminal between odd wavelengths and even wavelengths according to a respective target destination;

within a branching unit, passively directing with three interleavers, one for each trunk terminal, and three de-interleavers, one for each trunk terminal, each channel to the respective target destination;

interconnecting the three interleavers and the three de-interleavers in a configuration that the two output ports of the interleaver for each trunk terminal are respectively connected to an input port of the de-interleavers for the other two trunk terminals;

using optical band pass filters to separate and combine signals at the WDM signal spectrum and the signals at the loading light spectrum;

setting loading light at each trunk terminal to maintain power balance for all paths from a source terminal to the branching unit;

recycling the loading light at the branching unit for the path from the branching unit to a destination terminal; and at the destination terminal, receiving signals from one or more terminals combined by the de-interleavers at the branching unit.

2. The method as recited in claim 1, wherein the one or more submarine reconfigurable optical add/drop multiplexing systems include a passive branching unit.

3. The method as recited in claim 1, wherein the signals are wavelength-division multiplexed signals.

4. The method as recited in claim 1, wherein the three interleavers are 1:2 optical interleavers.

5. The method as recited in claim 1, wherein there is zero power consumption at the branching unit.

6. The method as recited in claim 1, wherein only a single fiber pair is employed for a branch link at the branching unit.

7. The method as recited in claim 1, wherein all channels are fully reconfigurable, thereby delivering $2^K$ configurations for each of the one or more source terminals, where K is a total number of the one or more optical channels.

8. The method as recited in claim 1, wherein the two or more groups of optical channels include odd and even groups.

9. A system for data transport, comprising:
one or more submarine reconfigurable optical add/drop multiplexing systems, the one or more systems separating the optical spectrum into a wavelength division multiplexed (WDM) signal spectrum for WDM signal, and a loading light spectrum, wherein the WDM signal spectrum is alternating odd and even channels, the one or more systems comprising:
one or more lasers at each of one or more transponders at a trunk terminal configured to tune a laser wavelength at the trunk terminal between odd wavelengths and even wavelengths according to a respective target destination;
a branching unit configured to passively direct each channel to the respective target destination using three interleavers, one for each trunk terminal, and three de-interleavers, one for each trunk terminal, located within the branching unit,
wherein the three interleavers and the three de-interleavers are interconnected in a configuration that the two output ports of the interleaver for each trunk terminal are respectively connected to an input port of the de-interleavers for the other two trunk terminals; and one or more optical pass band filters configured to separate and combine signals at the WDM signal spectrum and signals at the loading light spectrum,
wherein loading light is set at each trunk terminal to maintain power balance for all paths from a source terminal to the branching unit;
wherein the loading light is recycled at the branching unit for a path from the branching unit to a destination terminal; and
wherein signals from one or more terminals combined by the de-interleavers at the branching unit are received at the destination terminal.

10. The system as recited in claim 9, wherein the one or more submarine reconfigurable optical add/drop multiplexing systems include one or more passive branching units.

11. The system as recited in claim 9, wherein the signals are wavelength-division multiplexed signals.

12. The system as recited in claim 9, wherein the three interleavers are 1:2 optical interleavers.

13. The system as recited in claim 9, wherein there is zero power consumption at the branching unit.

14. The system as recited in claim 9, wherein only a single fiber pair is employed for a branch link at the branching unit.

15. The system as recited in claim 9, wherein all channels are fully reconfigurable, thereby delivering $2^K$ configurations for each of the one or more source terminals, where K is a total number of the one or more optical channels.

16. The system as recited in claim 9, wherein the two or more groups of optical channels include odd and even groups.

17. A method for data transport using one or more submarine reconfigurable optical add/drop multiplexing systems, comprising:
wherein the optical spectrum is separated into a wavelength division multiplexed (WDM) signal spectrum for WDM signals, and a loading light spectrum, and wherein the WDM signal spectrum is alternating odd and even channels;

tuning a laser wavelength at the transmitter at a trunk terminal between odd wavelengths and even wavelengths according to a respective target destination;

passively directing with one or more interleavers inside a branching unit each channel to the respective target destination;

interconnecting an interleaver, a de-interleaver, and two cyclic interleavers in a configuration such that two outputs of an interleaver for the trunk terminal are connected to an input port of a respective cyclic interleaver, and two inputs of a de-interleaver for the trunk terminal are connected to an output port of a respective cyclic interleaver;

using optical band pass filters to separate and combine signals at the WDM signal spectrum and the signals at the loading light spectrum;

setting loading light at each trunk terminal to maintain power balance for all paths from a source terminal to the branching unit;

recycling the loading light at the branching unit for the path from the branching unit to a destination terminal; and at the destination terminal, receiving signals from one or more terminals combined by the de-interleavers at the branching unit.

* * * * *